(12) United States Patent
Shimma

(10) Patent No.: US 8,482,650 B2
(45) Date of Patent: Jul. 9, 2013

(54) IMAGE PICKUP APPARATUS, DISPLAY CONTROL APPARATUS, AND DISPLAY CONTROL METHOD

(75) Inventor: Naoki Shimma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 243 days.

(21) Appl. No.: 12/775,214

(22) Filed: May 6, 2010

(65) Prior Publication Data

US 2010/0283859 A1 Nov. 11, 2010

(30) Foreign Application Priority Data

May 11, 2009 (JP) .................................. 2009-114443

(51) Int. Cl.
*H04N 5/222* (2006.01)
(52) U.S. Cl.
USPC ...... 348/333.05; 715/784; 715/786; 345/684; 345/687
(58) Field of Classification Search
USPC ... 348/207.1, 333.05; 715/784, 786; 345/684, 345/687
See application file for complete search history.

(56) References Cited

U.S. PATENT DOCUMENTS

| | | | | |
|---|---|---|---|---|
| 5,278,673 A | * | 1/1994 | Scapa et al. | 358/473 |
| 6,459,422 B1 | * | 10/2002 | Kirk | 345/169 |
| 7,110,025 B1 | * | 9/2006 | Loui et al. | 348/220.1 |
| 2005/0232599 A1 | * | 10/2005 | Doi | 386/95 |
| 2008/0032751 A1 | * | 2/2008 | Lee | 455/566 |
| 2008/0243758 A1 | * | 10/2008 | Kintzig et al. | 707/1 |
| 2009/0307633 A1 | * | 12/2009 | Haughay et al. | 715/841 |

FOREIGN PATENT DOCUMENTS

| | | | |
|---|---|---|---|
| JP | 2008-052433 A | | 3/2008 |
| JP | 2008052433 | * | 3/2008 |

* cited by examiner

*Primary Examiner* — Sinh Tran
*Assistant Examiner* — Paul Berardesca
(74) *Attorney, Agent, or Firm* — Canon U.S.A, Inc. IP Division

(57) ABSTRACT

An apparatus includes an image switching unit configured to switch an image displayed on a display unit such that if an image switching button is operated, the image displayed on the display unit is switched to a next image. The apparatus also includes a jump menu display unit configured such that if the image switching button is operated to continuously switch the displayed image, the jump menu display unit displays an image jump menu for jumping from the image currently displayed on the display unit to a desired image.

17 Claims, 4 Drawing Sheets

IMAGE PICKUP APPARATUS, DISPLAY CONTROL APPARATUS, AND DISPLAY CONTROL METHOD

BACKGROUND OF THE INVENTION

1. Field of the Invention

The present invention relates to displaying a menu or providing guidance during a displayed image switching operation in an image pickup apparatus or a display control apparatus.

2. Description of the Related Art

In an image pickup apparatus such as a digital camera, when the image pickup apparatus operates in an image playback mode in which an image is read from a memory card and displayed on a display screen, if an image switching button is operated, the displayed image is switched to a next image. This allows the images stored in the memory card to be displayed sequentially. Hereinafter, this function will be referred to simply as an image switching function. Note that the image is switched by one image at a time in response to pressing the image switching button.

Use of the image switching function in a normal manner allows a user to view and check images on a one-by-one basis, select a desired image, and perform a process such as printing on the selected image.

Japanese Patent Laid-Open No. 2008-052433 discloses an image playback technique in which if an image switching button is kept pressed down for a long time, the operation mode is switched into a thumbnail index display mode in which a plurality of images are displayed in the form of thumbnail images.

However, to find a desired one from a plurality of images, if images are sequentially displayed one by one in a predetermined order, it can be difficult to find the desired image, and thus it can take a long time to finally find the desired image.

Even if a plurality of reduced images are displayed on the display screen in the form of the thumbnail index view as in the technique disclosed in Japanese Patent Laid-Open No. 2008-052433, the displayed thumbnail images do not always include a desired image, and thus it may still take a long time to find the desired image.

Some digital cameras have an image jump function that allows a jump from an image being currently displayed to an image included in a specified folder or an image taken on a specified date thereby making it possible to quickly find a desired image. However, all users do not know that the digital camera has the image jump function. For such users who do not that the image jump function is available, the image jump function is useless.

SUMMARY OF THE INVENTION

According to an aspect of the present invention, there is provided an apparatus including a reading unit configured to read an image from a storage medium, a display unit configured to display the read image, an operation unit, a switching unit configured to, in response to an operation performed on the operation unit to switch an image, switch the displayed image to a next image in a predetermined order, and a display control unit configured to, in response to a continuous execution of the image switching to switch the image in the predetermined order, cause the display unit to display a menu screen for switching the image in a manner different from the manner in which the image is switched in the predetermined order.

Further features of the present invention will become apparent from the following description of exemplary embodiments with reference to the attached drawings.

DESCRIPTION OF THE EMBODIMENTS

The present invention is described in further detail below with reference to an image pickup apparatus and a display control apparatus according to embodiments in conjunction with the accompanying drawings.

Figure 1:
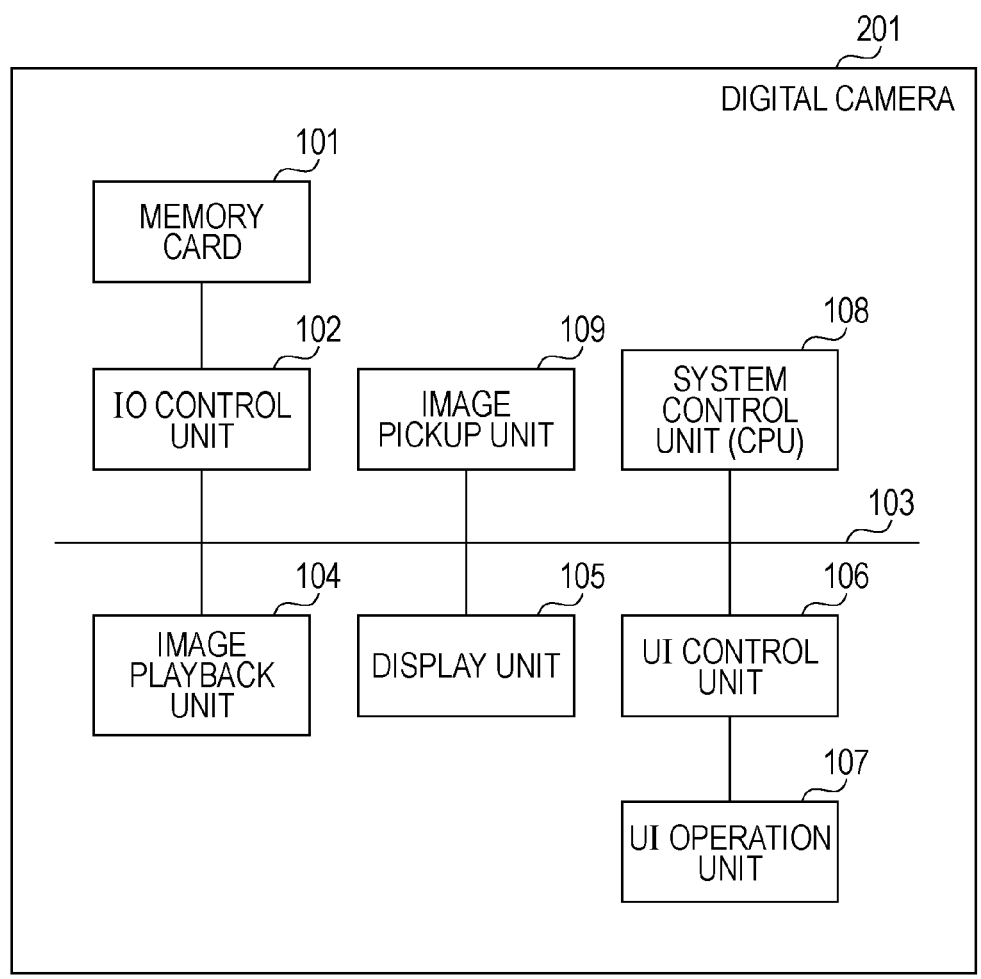
FIG. 1 is a block diagram illustrating a configuration of an image pickup apparatus according to an embodiment of the present invention.

FIG. 1 is a block diagram illustrating a configuration of a digital camera taken as an example of an image pickup apparatus or a display control apparatus according to an embodiment of the present invention.

Reference numeral 201 denotes a digital camera. The digital camera 201 includes an I/O control unit 102, a bus 103, an image playback unit 104, a display unit 105, a UI control unit 106, a UI operation unit 107, a system control unit 108, and an image pickup unit 109. The memory card 101 is removably attached to the digital camera 201. The system control unit 108, the I/O control unit 102, the image playback unit 104, the display unit 105, the UI control unit 106, and the UI operation unit 107 are connected to each other via the bus 103 such that data can be transmitted to each other via the bus 103.

The system control unit 108 centrally controls the units described above. The system control unit 108 includes a CPU (Central Processing Unit), a RAM (Random Access Memory), a ROM (Read Only Memory), etc., although they are not shown in FIG. 1. The CPU reads a program stored in the ROM and performs various processes described below by executing arithmetic operations and controlling various blocks according to the read program. The programs stored in the ROM include a program executed to display an image jump menu and jump to a specified image. The image jump menu is provided in the form of an operation screen that allows a user to switch the displayed image to an image other than an image that will be displayed in the image switching. The details of the image jump menu and the associated process will be described later.

The memory card 101 is used to store image data generated by the digital camera 201. Each piece of image data is assigned an image number (file name) determined in the order in which images were taken. Instead of the memory card 101, other types of external storage media such as an optical disk, an HDD (Hard Disk Drive), etc. may be used to embody the present invention. The I/O control unit 102 includes a slot, an input/output control circuit, etc., and is configured to read image data from the memory card 101 and transmit the read image data to the image playback unit 104.

The bus 103 functions to connect the various units to each other in the digital camera 201. Via the bus 103, image data and control signals for processes are transmitted among the units.

The image playback unit 104 is a unit configured to play back image data read by the I/O control unit 102. In the playback operation, the image data is decoded into a form that can be displayed on the display unit 105.

The display unit 105 is configured to display the read image data and a menu under the control of the UI control unit 106. The display unit 105 has a display screen for displaying the read image data and the menu. The display screen may be realized by a liquid crystal display (LCD) or the like. Note that there may be provided a plurality of display screens and the image data and the menu may be displayed on different display screens.

The UI operation unit 107 includes various operation buttons operable by a user and a detection circuit configured to detect operations performed on the respective operation buttons.

The operation buttons provided on the UI operation unit 107 include an image switching button (209,210) used to perform an image switching. The image switching will be described in detail later. The operation buttons on the UI operation unit 107 may be in the form of touch panel buttons that are formed integrally with the display unit 105 such that the buttons can be operated intuitively by a user.

The detection circuit in the UI operation unit 107 is configured such that when any operation button is operated by a user, the detection circuit detects the operation performed on the operation button and informs the UI control unit 106 that the operation button has been operated.

If the UI control unit 106 receives the notification from the UI operation unit 107, the UI control unit 106 determines the operation performed by the user and correspondingly issues commands to produce the image jump menu and display the image jump menu on the display unit 105.

The image pickup unit 109 includes an optical system including a lens, a shutter, etc., and an image sensing device such as a CCD configured to perform a photoelectric conversion on an image formed via the optical system. Image data obtained as a result of the photoelectric conversion performed by the image sensing device is stored in the memory card 101 via the I/O control unit 102.

Figure 2A:
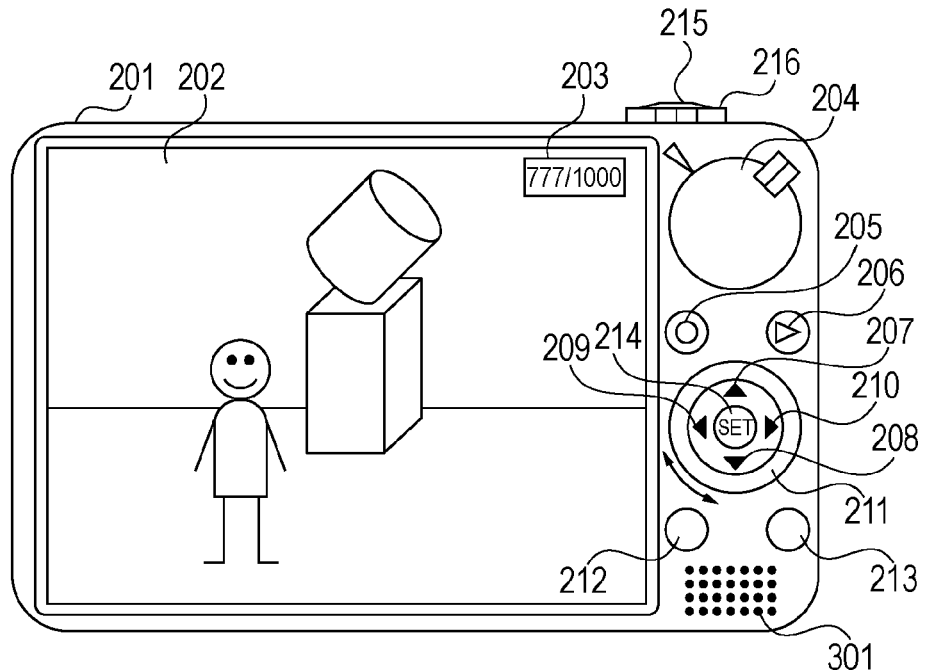
FIGS. 2A and 2B are diagrams illustrating a display unit, an operation unit, and an image jump menu displayed on the display unit according to an embodiment of the present invention.

FIG. 2A illustrates an example of a display screen disposed on the display unit 105 shown in FIG. 1 and also illustrates examples of operation buttons disposed on the UI operation unit 107 shown in FIG. 1.

In FIG. 2A, an external appearance of the digital camera 201 of FIG. 1 is shown. The digital camera 201 includes an LCD 202 disposed on the display unit 105 shown in FIG. 1 and operation members 204 to 216 disposed in the UI operation unit 107 shown in FIG. 1.

In the image playback mode, an image corresponding to image data stored in the memory card 101 inserted in the slot of the digital camera 201 is displayed on the LCD 202. In addition to the image, the total number (1000) of images stored in the memory card 101 and an image number (777) indicating which one of the images is currently displayed are also displayed on the LCD 202 in an area denoted by reference numeral 203. In this specific example, 1000 images are stored in the memory card 101, and a 777th image is currently displayed on the LCD 202. Note that in the present embodiment, the image data is displayed in the order of image number. Instead of displaying the image data in the order of image number, the image data may be displayed in the order in which the images were taken.

The operation members 204 to 216 are described in further detail below.

A mode switch dial 204 is used to switch a camera mode. Camera modes include, for example, a still image shooting mode and a moving image shooting mode.

A power switch button 205 is used to turn on/off electric power of the digital camera 201.

A playback button 206 is used to switch into an image playback mode in which an image of image data stored in the memory card 101 is displayed on the LCD 202. Generally, when the playback button 206 is operated by a user, the mode is switched into the playback mode, and image data stored in the memory card 101 is read by the I/O control unit 102 and displayed on the LCD 202.

An up-arrow button 207 is used to move a view of an image being displayed in an enlarged manner. The up-arrow button 207 is also used to move a focus on items in the menu being displayed. Note that the up-arrow button 207 is also used when an image jump function (described later) is used.

A down-arrow button 208 is used to move a view of an image being displayed in an enlarged manner, move a focus on items in the menu being displayed, or delete an image being displayed.

A left-arrow button 209 is used to move a view of an image being displayed in an enlarged manner. The left-arrow button 209 is also used to change the displayed image back to a previous image. A right-arrow button 210 is used to move a view of an image being displayed in an enlarged manner. The right-arrow button 210 is also used to change the displayed image to a next image. The left-arrow button 209 and the right-arrow button 210 are examples of image switching buttons disposed on the UI operation unit 107 shown in FIG. 1. In the image playback mode, if an image switching button is pressed by a user, image switching is performed and image displayed on the LCD 202 is changed to a next or previous image.

That is, the image switching is a process of switching the image being displayed on the display screen by one frame in a predetermined order (in the order of image number in the present embodiment). The image switching operation is an operation performed to make the digital camera execute the image switching process. In the present embodiment, if an image switching operation is performed by pressing an image switching button, then in response to the image switching operation, the image displayed on the display screen is switched to an image with a next image number or a previous image number. In the example shown in FIG. 2A, if the right-arrow button 210 is pressed, a 778th image is displayed on the LCD. On the other hand, in a case where the left-arrow button 209 is pressed, a 776th image is displayed. In a thumbnail index view mode in which reduced images are displayed in the form of a thumbnail index view, a focus frame for specifying an image is displayed. The focus frame can be moved by a user by pressing an image switching button.

A wheel button 211 is an operation member that is rotatable in both clockwise and counterclockwise directions as indicated by an arrow in FIG. 2A. The wheel button 211 is an example of an image switching button disposed on the UI operation unit 107 shown in FIG. 1, and is configured to be operable to issue a command to switch the displayed image reversely or forwardly by one image as with the left-arrow button 209 or the right-arrow button 210. In the present embodiment, rotating in the clockwise direction causes forward switching to a next image while rotating in the counterclockwise direction causes backward switching to a previous image.

The image switching buttons disposed on the UI operation unit 107 are not limited to the left-arrow button 209, the right-arrow button 210, and the wheel button 211, but other types of buttons may be used as long as they are capable of switching the image displayed on the display screen to a previous or next image.

A DISP button 212 is used to turn on/off the display screen.

A MENU button 213 is used to open/close a menu window or return the screen to a previous screen.

A SET button 214 is used to apply various selected items.

A shutter button 215 of the camera is used to take an image. When this button is pressed, an operation of taking an image is performed.

A zoom lever 216 is used for zooming in/out in an image taking operation. The zoom lever 216 is also used to enlarge or reduce an image played back.

Figure 2B:
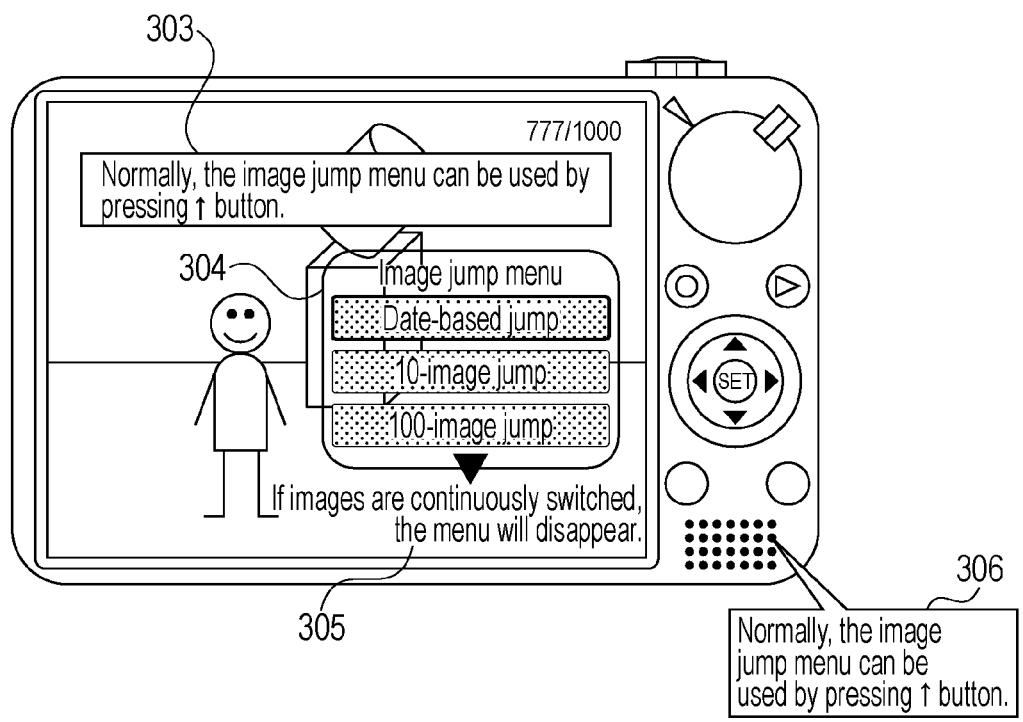

A speaker 302 is used to provide voice guidance. Next, referring to FIG. 2B, an explanation will be given below as to a process of displaying the image jump menu in response to a fast image switching operation performed by a user. FIG. 2B illustrates an example of a displayed image jump menu. In the following explanation, it is assumed that the image playback mode has been selected using the playback button 206.

If the wheel button 211 is continuously rotated in the clockwise direction to perform image switching, images are displayed in a fast image switching mode. In the fast image switching mode, switching to a previous/next image is performed repeatedly, or switching is performed quickly, or image switching is performed while skipping a specified number of images. In the present embodiment, the fast image switching is performed such that images are sequentially displayed one by one in the order of image number as in the normal image switching operation, but unlike the normal image switching, the image switching is performed repeatedly and quickly. Hereinafter, the operation of continuously rotating the wheel button 211 will be referred to a continuous image switching operation.

If the continuous image switching operation is performed, not only the above-described fast image switching is performed but also the image jump menu 304 is displayed to allow a user to use the image jump function. Although in the normal image switching or fast image switching the images are switched in the order of image number, the image jump function makes it possible to jump to an image that satisfies a particular condition instead of displaying images in the order of image number. The image jump menu 304 includes items such as date-based jump, 10-image jump, 100-image jump, etc. The date-based jump is an item that allows images to be displayed based on the date. If the right-arrow button is pressed, an image with a date that is closest to and after the date of the current image is displayed. In a case where the left-arrow button is pressed, an image with a date that is closest to and before the date of the current image is displayed. In the case of the 10-image jump or 100-image jump, images are displayed in the order of image number while skipping 9 or 99 images. That is, if the 10-image jump is executed, the image is switched to an image that is 10 images previous to or ahead of the current image. In the case of the 100-image jump, the image is switched to an image that is 100 images previous to or ahead of the current image. To use the image jump function, a user presses the SET button 214 in a state in which one of the items in the image jump menu 304 is selected via the up-arrow button 207 or the down-arrow button 208. In response to pressing the SET button 214, the displayed image is jumped from the current image to an image that satisfies the condition specified in the selected item. Instead of the SET button, the image jump function may be executed in response to pressing the left-arrow or right-arrow button. In the case where the left-arrow or right-arrow button is used, it is possible to accomplish, by only one-step operation, both activating the image jump function and selecting whether a previous or following image is to be displayed.

Note that the continuous image switching operation is not limited to the continuous rotation of the wheel button 211. The continuous image switching operation may also be accomplished, for example, by successively pressing the left-arrow button 209 or the right-arrow button, long-pressing the left-arrow button 209 or the right-arrow button, or pressing the wheel button 211 or the left-arrow button 209 or the right-arrow button 210 a predetermined number of times. In FIG. 2B, a message 305 is displayed to notify that if the image switching button is operated again in the state in which the image jump menu 304 is displayed, the image jump menu 304 will disappear. A message 303 is displayed to provide information about a normal method of using the image jump function. The normal usage method refers to a process of pressing the up-arrow button 207 when an image is being displayed in the image playback mode according to the present embodiment thereby to display the image jump menu. More specifically, in the example shown in FIG. 2B, the message 303 displayed on the LCD indicates that the image jump function is enabled by pressing the up-arrow button 207 in the image playback mode. In a case where the digital camera 201 has a built-in speaker 301, voice guidance may be provided as to the normal method of using the image jump function as shown in a speech balloon 306.

Figure 3A:
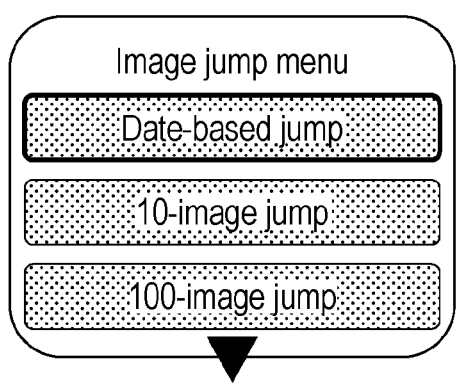
FIGS. 3A to 3D are diagrams illustrating examples of items of an image jump menu according to an embodiment of the present invention.

The image jump menu shown in FIG. 2B is explained in further detail below with reference to FIGS. 3A to 3D. When the continuous image switching operation is detected, the image jump menu is first displayed. In this initial state, as shown in FIG. 3A, the image jump menu includes items indicating sub image jump functions. The items may include a date-based jump function that allows jumping to an image based on the date on which the image was taken, a category-based jump function that allows jumping to an image belonging to a specified category such as portraits, landscapes, etc., a folder-based jump function that allows jumping to one of images based on a folder in which images are stored, a moving image jump function that allows jumping to a moving image, a 10-image jumping function that allows jumping to an image that is 10 images ahead of the current image, and a 100-image jumping function that allows jumping to an image that is 100 images ahead of the current image.

Figure 3B:
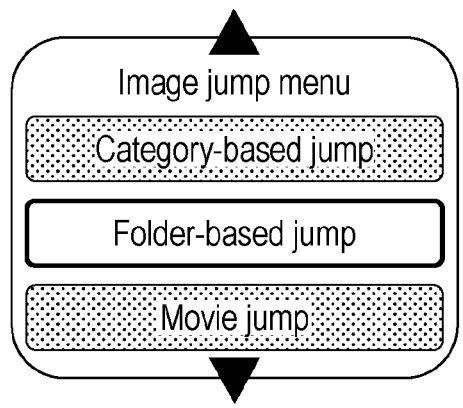

In the state in which the image jump menu described above is displayed, a user is allowed to press the up-arrow button 207 or the down-arrow button 208 to move the focus to a particular item in the image jump menu as shown in FIG. 3B so as to specify the item to find a particular image. In the example shown in FIG. 3B, the specified item in the image jump menu is highlighted in an open box. The menu item is finally determined when the SET button 214 is pressed in the state in which the specific item is specified. For items having sub items, such as the date-based jump, the category-based jump, etc., sub items are displayed as shown in FIGS. 3C and 3D.

The sub items are displayed based on EXIF (Exchangeable Image File Format) information associated with the images stored in the memory card. For example, for the sub items of the date-based jump, the shooting date of each image is acquired from the EXIF information, and the shooting dates of all images stored in the memory card are examined. A result is displayed as sub items in the form of a shooting date list.

Figure 3C:
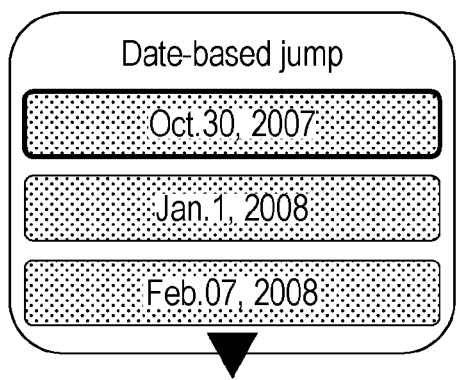
Figure 3D:
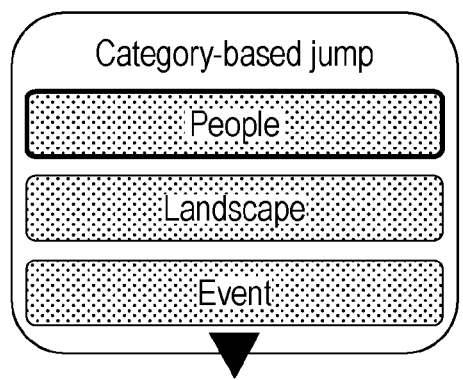

In the date-based jump menu including sub menus shown in FIG. 3C, an item can be specified by pressing the up-arrow button 207 or the down-arrow button 208. If the SET button 214 is then pressed, the specified item is finally determined. For example, in a case where an item "2007 Oct. 30" is determined, an image with the smallest image number is selected from all images that were taken on Oct. 30, 2007, and jumping to this image is performed. After the jumping is performed, if the wheel button 211 is rotated, the images that were taken on Oct. 30, 2007 are sequentially displayed. If the left-arrow button 209 or the right-arrow button 210 is pressed, the date of images displayed is switched to another date. In the example shown in FIG. 3C, if the right-arrow button is pressed once, the date is switched to Jan. 1, 2008. If the right-arrow button 210 is further pressed once, the date is switched to Feb. 7, 2008. The operation associated with sub items of the category-based jump is performed in a similar manner to the sub items of the date-based jump.

In the case of jump functions in which it is not necessary to display sub items, as with the 10-image jump, if an item in the image jump menu such as that shown in FIG. 3A or 3B is selected, direct jumping from the current image to an image 10 images ahead of the current image is performed. Thereafter, the displayed image is advanced by 10 images each time the right-arrow button 210 is pressed, or returned back by 10 images each time the left-arrow button 209 is pressed. Even in this state, the image can be switched forward or backward by one image by rotating the wheel button 211. The 100-image jump is performed in a similar manner to the 10-image jump except that the displayed image is advanced or returned back by 100 images each time the right-arrow button 210 or the left-arrow button 209 is pressed.

Note that the displaying of the image jump menu may be controlled such that once the image jump function is enabled using the normal method, then the image jump menu may not be displayed in response to a further operation on the image switching button. That is, after the image jump menu is used once by a user by pressing the up-arrow button 207 during the image switching, the image jump menu 304 shown in FIG. 2B is not displayed thereafter even when the wheel button 211 is rotated.

Different image jump menus may be displayed depending on whether the continuous image switching operation is performed or the normal usage method is used. For example, the image jump menu displayed in response to the continuous image switching operation may be configured such that if one of items of the menu is selected, direct jumping to a specified image is immediately performed. On the other hand, the image jump menu displayed in response to the operation of the normal usage method may be configured such that sub items for each jump function are displayed thereby allowing a user to specify detailed jumping conditions.

Some items of the image jump menu may not be displayed depending on the number of images stored in the memory card 101. For example, when the number of images stored in the memory card 101 is less than 100, the 100-image jump function is not necessary, and thus the menu item for the 100-image jump function may not be displayed. On the other hand, in a case where the memory card 101 has only one folder, the jump menu associated with the folder-based jump function may not be displayed. In a case where all images stored in the memory card 101 were taken on the same date, the menu item associated with the date-based jump function may not be displayed.

Alternatively, instead of not displaying a particular item, the priority for the item may be lowered and the item may be displayed at a lower position than the other items or the item may be disabled.

Figure 4:
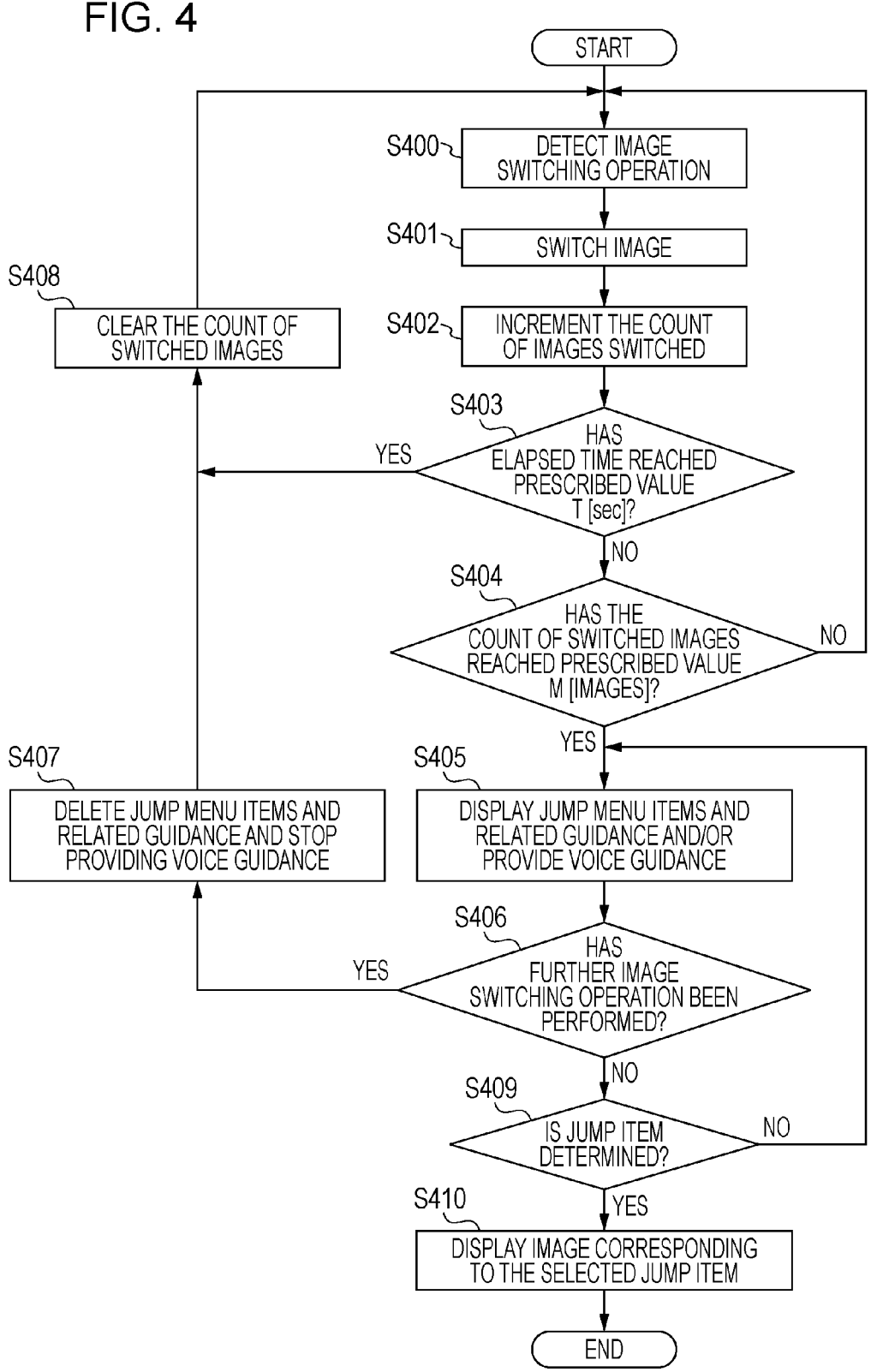
FIG. 4 is a flow chart illustrating a process of displaying an image jump menu according to an embodiment of the present invention.

Next, referring to a flow chart shown in FIG. 4, an explanation is given below as to a process of displaying the image jump menu in response to the image switching operation using the image switching button. A program executed to perform the flow chart shown in FIG. 4 is stored in the ROM (not shown) provided in the system control unit 108 shown in FIG. 1. The system control unit 108 executes various processes according to a command issued by the UI control unit 106.

In the image playback mode, first, one frame of image data is read from the memory card 101 by the I/O control unit 102 and displayed on the LCD 202 of the display unit 105. In this state, the process of the flow chart shown in FIG. 4 is started.

In step S400, if the image switching operation is performed by a user by rotating the wheel button 211 shown in FIG. 2A, the detection circuit disposed in the UI operation unit 107 detects this operation. On detecting the rotating operation on the wheel button 211, the UI operation unit 107 outputs a detection signal to the UI control unit 106 (step S400). Note that the image switching operation in step S400 is not limited to the rotating operation on the wheel button 211, but the image switching operation may be accomplished by pressing the right-arrow button 210 or the left-arrow button 209. More generally, any operation may be used as long as the operation causes the image displayed on the display screen by one image.

In step S401, if the UI control unit 106 receives the detection signal from the UI operation unit 107, the UI control unit 106 determines the operation on the image switching button. The image switching process is then performed so as to change the image displayed on the display screen by one image (step S401). This process is performed by the system control unit 108 by issuing a command to the I/O control unit 102 to read a next image from the memory card 101.

In step S402, the count of images switched is incremented by 1 each time the displayed image is switched by one image thereby determining the number of images that have been switched. A counter for counting the number of images switched is formed in a memory (not shown) provided in the system control unit 108. This counting process is performed by a CPU (not shown) disposed in the system control unit 108. The system control unit 108 measures, using a timer (not shown), the time elapsed since the last increment of the count of images switched was performed in step S402.

In step S403, the system control unit 108 determines whether the time measured by the timer has reached a prescribed value T [sec] (S403). If it is determined in step S403 that the elapsed time has reached the prescribed value T [sec], the system control unit 108 clears the count of images switched (S408). The process is then returns to step S400.

In step S404, the system control unit 108 checks whether the number of images switched has reached a prescribed value M [images] to determine whether the continuous image switching operation has been performed (S404). If it is determined in step S404 that the number of images switched has not reached the prescribed value M [images], the process waits until the continuous image switching operation is performed.

As for the prescribed value T [sec] and the prescribed value M [images], default values preset in the digital camera may be used, or the values may be variable by a user and values specified by the user may be employed.

In step S405, the system control unit 108 issues a display command to display the image jump menu on the display unit 105 and also display a message on the display unit 105 to notify that the image jump function can be used by the normal usage method. This display command is issued together with a fast image switching command to the image playback unit 104. In response to receiving the display command, the display unit 105 displays the image jump menu and the message indicating the normal method of using the image jump function. As for the image jump menu, the menu 304 shown in FIG. 2B may be used. As for the message indicating that the image jump function can be used by the normal usage method, the message 303 shown in FIG. 2B may be used. In the present embodiment, the normal usage method involves pressing the up-arrow button 207 in the image playback mode thereby displaying the image jump menu. This notification message is produced together with the display command to display the image jump menu, and is displayed on the display screen of the display unit 105.

Furthermore, the display unit 105 displays a menu such as the menu 305 shown in FIG. 2B on the display screen to notify a user that if the image switching is further performed continuously, the image jump menu will disappear from the display screen.

By notifying the user that pressing the up-arrow button 207 causes the image jump menu to be displayed, it becomes possible for the user to notice that the image jump function is available to efficiently find a desired image.

In step S405, instead of displaying the message on the display unit 105 to notify of the normal method of using the image jump function, the notification may be given to the user via a voice message. In the case where the notification is given in the form of a voice message, it is possible to notify the user of the normal method of using the image jump function without reducing the image area of the display unit 105 by the message.

In step S406, a determination is made as to whether the image switching button is operated by the user when the image jump menu is displayed or the notification is given as to the normal usage method in step S405 (S406). In a case where it is determined in step S406 that the image switching button is operated, the system control unit 108 issues a command to the display unit 105 to stop displaying the image jump menu and the message 305 shown in FIG. 2B and also issues a command to stop providing the voice guidance (S407). This is performed because when the image switching operation is further performed by the user when the image jump menu is displayed, use of the image jump function is not necessary in most cases. After the displaying of the image jump menu or the message indicating the normal method of using the image jump function is stopped in step S407, the count of images switched is cleared (S408), and the process waits until a next image switching operation is performed by the user. Although in the process described above, when it is determined in step S406 that a further image switching operation is performed in the state in which the image jump menu is displayed, the displaying of the image jump menu is stopped in step S407, the displaying of the image jump menu may be stopped when a predetermined number of images have been switched after the image jump menu is displayed.

After the focus on the image jump menu is moved by pressing the up-arrow button 207 or the down-arrow button 208 to select one of the items of the image jump menu, if the UI operation unit 107 detects that the selected item has been finally determined by pressing the SET button 214 (S409), then the image playback unit 104 plays back an image in accordance with the selected jump item. The display unit 105 receives the image from the image playback unit 104 and displays the received image on the display screen of the display unit 105 (S410). Once one of the jump items of the image jump menu is selected in step S409, an image corresponding to the selected jump item is displayed each time the left-arrow button 209 or the right-arrow button 210 is pressed until the image jump function is canceled. For example, in the case where the date-based jump function is selected, the date of the image displayed is switched each time the left-arrow button 209 or the right-arrow button 210 is pressed. In the case where the 10-image jump function is selected, the image displayed is switched to an image 10 frames ahead of or previous to the current image each time the left-arrow button 209 or the right-arrow button 210 is pressed.

In the present embodiment, the image jump function can be used during the image switching operation, and the notification is given as to the method of using the image jump function. This allows a user to notice that the image jump function is available to efficiently find a desired image by continuously performing the continuous image switching operation. Thus, it is possible to provide a high usability digital camera according to the present embodiment of the invention.

Although in the present embodiment the determination as to whether the continuous image switching operation is performed is made based on the measured number of images switched, the determination may be made based on a measured time during which the image switching operation is performed repeatedly. When it is detected that the image switching operation has been performed repeatedly for a long time, it is determined that use of the image jump function will allow a user to find a desired image in a shorter time than switching the image one by one, and the image jump menu is displayed to prompt the user to use the image jump function to jump to the desired image.

Alternatively, when it is detected that the image switching button is kept pressed for a long time, the image jump menu may be displayed. In this case, instead of counting the number of images switched in step S402 of the flow chart shown in FIG. 4, the system control unit 108 measures the time for which the image switching button is kept pressed down by a user. Furthermore, steps S403 and S404 are modified such that a determination is made as to whether the time for which the image switching button is kept pressed down has reached a prescribed value. In a case where the image switching button is released before the elapsed time reaches the prescribed value, the process returns to step S400. On the other hand, if the image switching button is kept pressed down for a time equal to or longer than the prescribed value, the process proceeds to step S405.

As described above, the image jump menu may be displayed when the image switching button is kept pressed down over a long time, or the image jump menu may be displayed when the image switching operation is performed a predetermined number of times, or the image jump menu may be displayed either one of the above conditions is satisfied.

Alternatively, when the image switching button is kept pressed down for a long time, the image displayed is advanced by a plurality of images. In this case, if the image switching button is further kept pressed down for a predetermined time, the image jump menu may be displayed. As described above, the timing of displaying the image jump menu may be changed depending on the number of times the image switching button is pressed down or depending on the time for which the image switching button is kept pressed down.

Two separate display units may be provided such that an image stored in the storage medium is displayed on one display unit, and the image jump menu is displayed on the other display unit. By displaying the image and the image jump menu on different display units, it becomes possible to more easily view the image displayed during the image switching operation. This allows a user to easily determine whether to use the image jump function depending on the image displayed during the image switching operation.

In the embodiments described above, the detailed explanation has been provided with reference to the digital camera taken as an example of an image pickup apparatus. However, the present invention is not limited to the digital camera, but the invention may be applied to other types of image pickup apparatuses such as a video camera or other apparatuses having the capability of playing back an image taken and stored in a storage medium.

Furthermore, the present invention may be applied to many types of display control apparatuses such as an information processing apparatus having a display screen, a projector configured to display an image, a printer having a touch panel, a portable telephone device, etc. The features of the embodiments of the present invention may also be achieved by providing to a system or an apparatus a storage medium having software program code stored therein for implementing the functions disclosed in the embodiments described above and by reading and executing the program code on a computer (or a CPU or an MPU) disposed in the system or the apparatus. In this case, it should be understood that the program code read from the storage medium implements the functions of the embodiments of the invention, and thus the program code and the storage medium in which the program code is stored fall within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-114443 filed May 11, 2009, which is hereby incorporated by reference herein in its entirety.

What is claimed is:

1. An apparatus comprising:
    a reading unit configured to read an image from a storage medium;
    a display unit configured to display the read image;
    a switching unit configured to, in response to an operation performed on an operation unit, switch the displayed image to a next image in a predetermined order; and
    a control unit configured to, in response to a continuous execution of the image switching to switch the image in the predetermined order, cause the display unit to display a menu screen for switching the image in a manner different from the manner in which the image is switched in the predetermined order, wherein
    the menu screen includes a jump menu that allows a user to use an image jump function,
    wherein the control unit is configured such that after the menu screen is displayed, if the operation unit is operated for switching the image or if the image switching operation is performed for a predetermined number of images, the control unit deletes the menu screen.

2. The apparatus according to claim 1, wherein if the operation unit is continuously performed to switch the image, the control unit controls the display unit to display the menu screen.

3. The apparatus according to claim 1, wherein if the operation unit is pressed a predetermined number of times or if the operation unit is pressed and kept pressed for a long time, the control unit controls the display unit to display the menu screen.

4. The apparatus according to claim 1, wherein:
    the menu screen includes a plurality of items for switching the image in manners different from the manner in which the image is switched in the predetermined order; and
    if one of the plurality of items is selected, the control unit switches the displayed image to an image according to the selected item.

5. The apparatus according to claim 4, wherein the plurality of items include one or more of an item for switching to an image a specified number of images ahead of a current image, an item for switching to an image with a specified date, an item for switching to an image stored in a specified folder in the storage medium, and an item for switching to an image of a specified category.

6. An apparatus comprising:
    a reading unit configured to read an image from a storage medium;
    a display unit configured to display the read image;
    an operation unit;
    a switching unit configured to, in response to an operation performed on the operation unit, switch the displayed image to a next image in a predetermined order; and
    a control unit configured to, in response to a continuous execution of the image switching to switch the image in the predetermined order, cause the display unit to display a menu screen for switching the image in a manner different from the manner in which the image is switched in the predetermined order,
    wherein the control unit is configured such that after the menu screen is displayed, if the operation unit is operated for switching the image or if the image switching operation is performed for a predetermined number of images, the control unit deletes the menu screen.

7. A camera comprising a reading unit configured to read an image from a storage medium, a display unit configured to display the read image, an operation unit configured to be operable to perform an operation, and a control unit configured to control displaying on the display unit, the camera having:
    an image switching function of switching a displayed image such that in response to the operation performed on the operation unit, one of a plurality of images stored in the store medium is selected in a predetermined order and displayed on the display unit; and
    a search and display function of displaying an image such that an image satisfying a particular condition is searched for from the plurality of images and a found image is displayed,
    the control unit being configured such that if the operation unit is operated to continuously switch the displayed image using the image switching function, the control unit controls displaying such that images are displayed one by one in accordance with the operation performed on the operation unit, and a menu screen including selection items for executing the search and display function is displayed with the image on the display unit, wherein
    the menu screen includes a jump menu that allows a user to use an image jump function, and
    wherein the control unit is configured such that if the operation unit is operated to continuously switch the displayed image, the control unit displays a message on the display unit to notify a user of an operation method for displaying the menu screen that allows the displayed image to be switched in a manner different from the predetermined order in which the image is continuously switched.

8. The camera according to claim 7, wherein the control unit displays the menu screen on the display unit such that the menu screen is superimposed on the displayed image.

9. The camera according to claim 7, wherein the menu screen includes a plurality of selection items,
and wherein if one of the plurality of selection items is selected, the control unit switches the displayed image to an image according to the selected item.

10. The camera according to claim 7, wherein the menu screen includes a plurality of selection items,
the plurality of selection items including one or more of an item for switching to an image a specified number of images ahead of a current image, an item for switching to an image with a specified date, an item for switching to an image stored in a specified folder in the storage medium, and an item for switching to an image of a specified category.

11. A method comprising:
reading an image from a storage medium;
in response to an operation performed on an operation unit to switch an image, switching the displayed image to a next image in a predetermined order; and
in response to a continuous execution of the operation to switch the image in the predetermined order, displaying a menu screen for switching the image in a manner different from the manner in which the image is switched in the predetermined order,
wherein the menu screen includes a jump menu that allows a user to use an image jump function, and
wherein after the menu screen is displayed, if the operation unit is operated for switching the image or if the image switching operation is performed for a predetermined number of images, deleting the menu screen.

12. The method according to claim 11, further comprising displaying the menu screen if the operation unit being continuously performed to switch the image.

13. The method according to claim 11, further comprising displaying the menu screen if the operation unit being pressed a predetermined number of times or if the operation unit being pressed and kept pressed for a long time.

14. The method according to claim 11, wherein:
the menu screen includes a plurality of items for switching the image in manners different from the manner in which the image is switched in the predetermined order; and
if one of the plurality of items is selected, switching the displayed image to an image according to the selected item.

15. The method according to claim 14, wherein the plurality of items include one or more of an item for switching to an image a specified number of images ahead of a current image, an item for switching to an image with a specified date, an item for switching to an image stored in a specified folder in the storage medium, and an item for switching to an image of a specified category.

16. A method comprising:
reading an image from a storage medium;
in response to an operation performed on an operation unit to switch an image, switching the displayed image to a next image in a predetermined order; and
in response to a continuous execution of the operation to switch the image in the predetermined order, displaying a menu screen for switching the image in a manner different from the manner in which the image is switched in the predetermined order,
after the menu screen is displayed, if the operation for switching the image is operated or if the image switching operation is performed for a predetermined number of images, deleting the menu screen.

17. An apparatus comprising a reading unit configured to read an image from a storage medium, a display unit configured to display the read image, an operation unit configured to be operable to perform an operation, and a control unit configured to control displaying on the display unit, the apparatus having:
a switching function of switching an image displayed on the display unit such that in response to the operation, one of a plurality of images stored in the store medium is selected in a predetermined order and displayed on the display unit; and
a search and display function of displaying an image such that an image satisfying a particular condition is searched for from the plurality of images and a found image is displayed,
the control unit being configured such that if the operation unit is operated to continuously switch the displayed image using the switching function, the control unit controls displaying such that images are displayed on the display unit one by one in accordance with the operation, and a menu screen including selection items for executing the search and display function is displayed such that the menu screen is superimposed on the displayed image,
wherein the menu screen includes a jump menu that allows a user to use an image jump function, and
wherein the control unit is configured such that if the operation unit is operated to continuously switch the displayed image, the control unit displays a message on the display unit to notify a user of an operation method for displaying the menu screen that allows the displayed image to be switched in a manner different from the predetermined order in which the image is continuously switched.

* * * * *